(12) United States Patent  
Yamazaki et al.

(10) Patent No.: US 12,151,966 B2  
(45) Date of Patent: Nov. 26, 2024

(54) FILM-COVERED TRANSPARENT BASE PLATE AND TOP PLATE FOR COOKING DEVICE

(71) Applicants: NIPPON ELECTRIC GLASS CO., LTD., Otsu (JP); TOHOKU UNIVERSITY, Sendai (JP)

(72) Inventors: Yusuke Yamazaki, Otsu (JP); Masaaki Imura, Otsu (JP); Hitoshi Takamura, Sendai (JP); Akihiro Ishii, Sendai (JP); Mina Yamaguchi, Sendai (JP)

(73) Assignees: NIPPON ELECTRIC GLASS CO., LTD., Shiga (JP); TOHOKU UNIVERSITY, Miyagi (JP)

( * ) Notice: Subject to any disclaimer, the term of this patent is extended or adjusted under 35 U.S.C. 154(b) by 112 days.

(21) Appl. No.: 17/607,548

(22) PCT Filed: Jun. 29, 2020

(86) PCT No.: PCT/JP2020/025428  
§ 371 (c)(1),  
(2) Date: Oct. 29, 2021

(87) PCT Pub. No.: WO2021/002304  
PCT Pub. Date: Jan. 7, 2021

(65) Prior Publication Data  
US 2022/0242782 A1    Aug. 4, 2022

(30) Foreign Application Priority Data  
Jul. 1, 2019 (JP) .................................. 2019-122894

(51) Int. Cl.  
*B32B 15/04* (2006.01)  
*B32B 17/06* (2006.01)  
(Continued)

(52) U.S. Cl.  
CPC .......... *C03C 17/008* (2013.01); *C03C 17/007* (2013.01); *C03C 17/3411* (2013.01);  
(Continued)

(58) Field of Classification Search  
CPC .......... C03C 17/3411; C03C 2217/734; G02B 5/003  
(Continued)

(56) References Cited

U.S. PATENT DOCUMENTS 5,661,596 A * 8/1997 Biro ....................... G02B 1/115  
                                                 359/359  
5,891,556 A * 4/1999 Anderson ............... C03C 27/10  
                                                 359/359  
(Continued)

FOREIGN PATENT DOCUMENTS

CN        101536608 A       9/2009  
CN        102653151 A       9/2012  
(Continued)

OTHER PUBLICATIONS

Official Communication issued in corresponding Chinese Patent Application No. 202080047689.7, mailed on Jan. 4, 2023.  
(Continued)

*Primary Examiner* — Lauren R Colgan  
(74) *Attorney, Agent, or Firm* — Keating & Bennett, LLP

(57) ABSTRACT

Provided is a film-covered transparent base plate having an excellent aesthetic appearance even during turn-off of a light source. A film-covered transparent base plate 1 includes a transparent base plate 2 and a light-absorbing film 3 provided on one principal surface 2a of the transparent base plate 2 and the light-absorbing film 3 includes a dielectric phase made of a material having a band gap of not less than 2.0 eV and not more than 2.7 eV and a metallic phase.

10 Claims, 6 Drawing Sheets

(51) Int. Cl.
*C03C 17/00* (2006.01)
*C03C 17/34* (2006.01)
*C03C 17/36* (2006.01)
*F24C 15/10* (2006.01)
*G02B 5/00* (2006.01)

(52) U.S. Cl.
CPC .......... *C03C 17/3435* (2013.01); *C03C 17/36* (2013.01); *F24C 15/10* (2013.01); *G02B 5/003* (2013.01); *C03C 2217/45* (2013.01); *C03C 2217/479* (2013.01); *C03C 2217/734* (2013.01); *C03C 2218/15* (2013.01)

(58) Field of Classification Search
USPC .......................................... 428/426, 428, 432
See application file for complete search history.

(56) References Cited

U.S. PATENT DOCUMENTS

| | | | | |
|---|---|---|---|---|
| 5,942,331 | A * | 8/1999 | Miyauchi | C03C 17/008 428/428 |
| 6,251,524 | B1 * | 6/2001 | Ishizeki | C03C 17/007 428/323 |
| 6,686,049 | B1 * | 2/2004 | Nakamura | C03C 17/008 359/359 |
| 6,924,037 | B1 * | 8/2005 | Joret | B32B 17/10174 428/432 |
| 7,744,951 | B2 * | 6/2010 | Varaprasad | C03C 17/3681 428/688 |
| 7,833,629 | B2 * | 11/2010 | Anderson | G02B 1/115 428/428 |
| 9,944,553 | B2 * | 4/2018 | Mahieu | C03C 17/366 |
| 10,393,389 | B2 * | 8/2019 | Yamazaki | C03C 17/3411 |
| 11,608,289 | B2 * | 3/2023 | Magdenko-Savourey | C03C 17/3435 |
| 2007/0292659 | A1 * | 12/2007 | Li | G06F 3/041 428/323 |
| 2010/0072884 | A1 | 3/2010 | Tchakarov et al. | |
| 2010/0225227 | A1 | 9/2010 | Tchakarov et al. | |
| 2013/0168651 | A1 | 7/2013 | Tchakarov et al. | |
| 2014/0322502 | A1 * | 10/2014 | Koyama | G02B 1/115 428/212 |
| 2016/0070033 | A1 * | 3/2016 | Schlott | F24S 70/30 252/582 |
| 2017/0223826 | A1 | 8/2017 | Okami | |
| 2017/0227234 | A1 | 8/2017 | Yamazaki et al. | |
| 2017/0355638 | A1 * | 12/2017 | Varanasi | C03C 17/3417 |
| 2018/0203354 | A1 | 7/2018 | Fujii | |
| 2019/0194065 | A1 | 6/2019 | Henn et al. | |
| 2020/0123049 | A1 | 4/2020 | Fujii | |
| 2020/0131623 | A1 * | 4/2020 | Magdenko-Savourey | C22C 32/0026 |
| 2020/0189959 | A1 * | 6/2020 | Magdenko-Savourey | C03C 17/008 |

FOREIGN PATENT DOCUMENTS

| | | |
|---|---|---|
| CN | 106796464 A | 5/2017 |
| CN | 108312655 A | 7/2018 |
| JP | 07-330379 A | 12/1995 |
| JP | 2014-215018 A | 11/2014 |
| JP | 2016-522317 A | 7/2016 |
| WO | 2016/031801 A1 | 3/2016 |
| WO | 2016/059899 A1 | 4/2016 |
| WO | 2018/197821 A1 | 11/2018 |

OTHER PUBLICATIONS

Official Communication issued in International Patent Application No. PCT/JP2020/025428, mailed on Sep. 24, 2020.
Cao et al., "A review of cermet-based spectrally selective solar absorbers", Energy & Environmental Science, 2014, pp. 1615-1627.
Liu et al., "Enhancement of the Photoelectrochemical Performance of W03 Vertical Arrays film for Solar Water Splitting by Gadolinium Doping", The Journal of Physical Chemistry 119, 2015, pp. 14834-14842.
Bose et al., "Effect of silver incorporation in phase formation and band gap tuning of tungsten oxide thin films", Journal of Applied Physics 112, 2012, 9 pages.

* cited by examiner

[FIG. 1.]
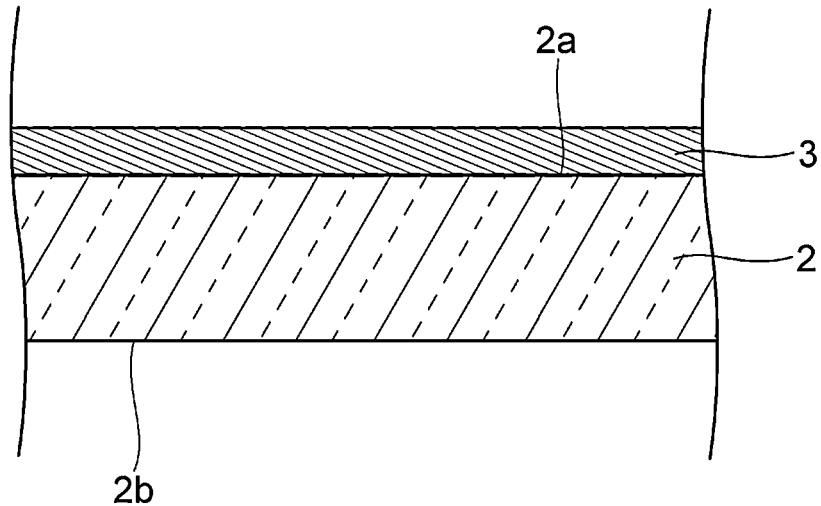
[FIG. 2.]
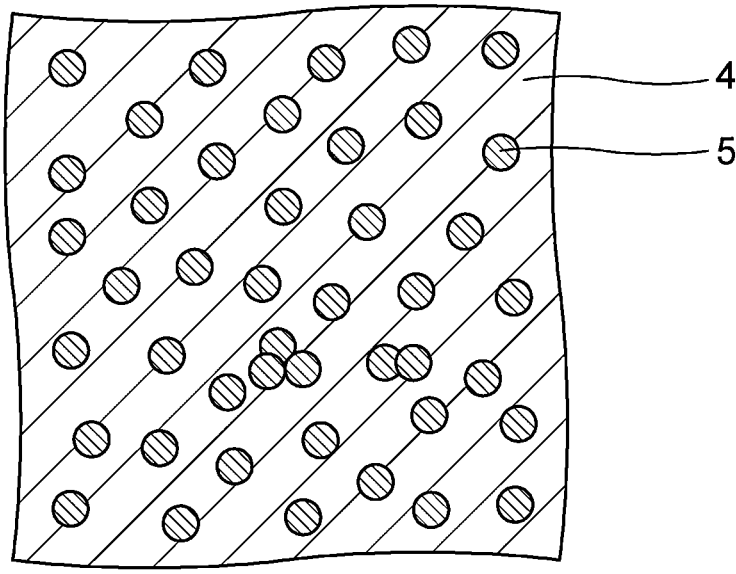

[FIG. 3.]
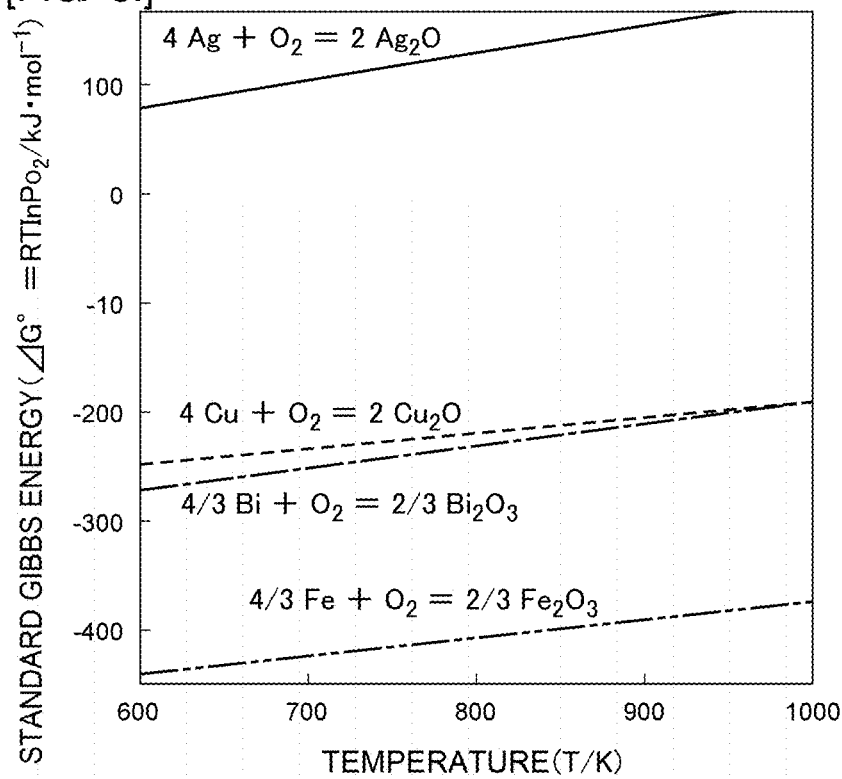
[FIG. 4.]
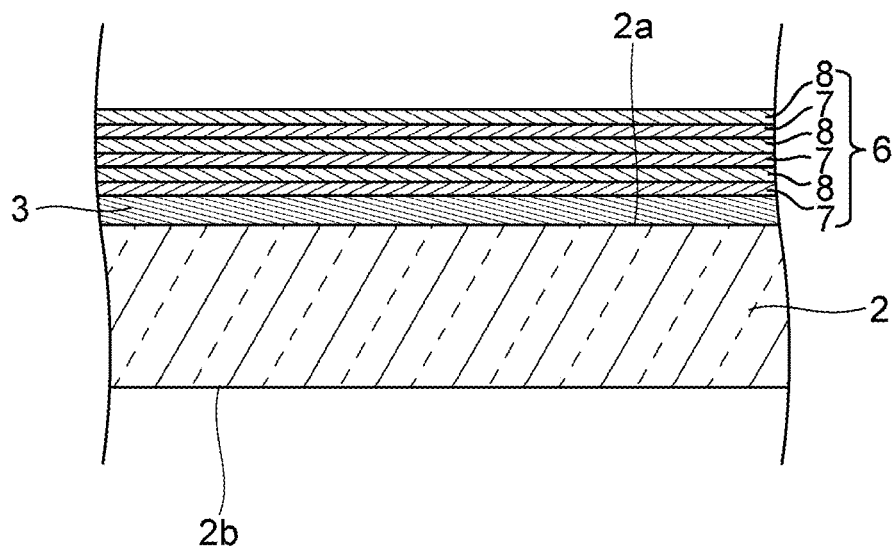

[FIG. 5.]
31
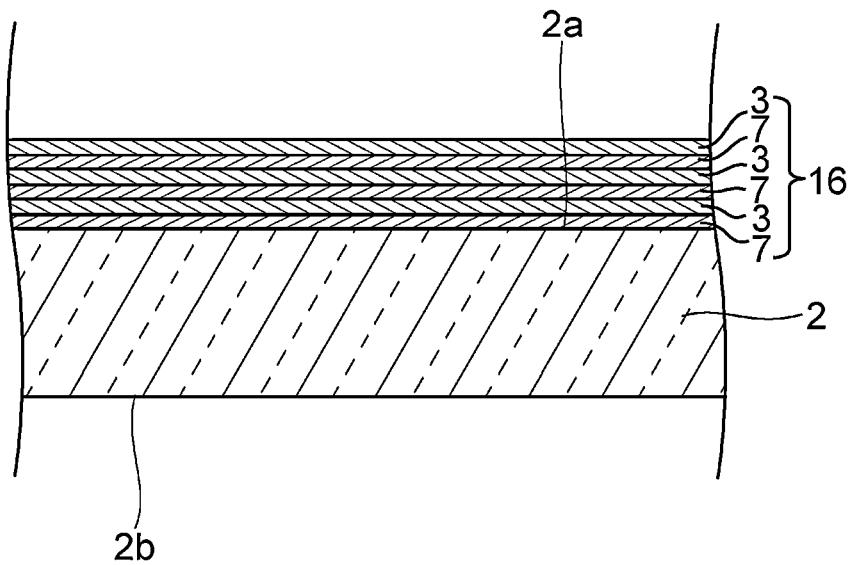
[FIG. 6.]
41
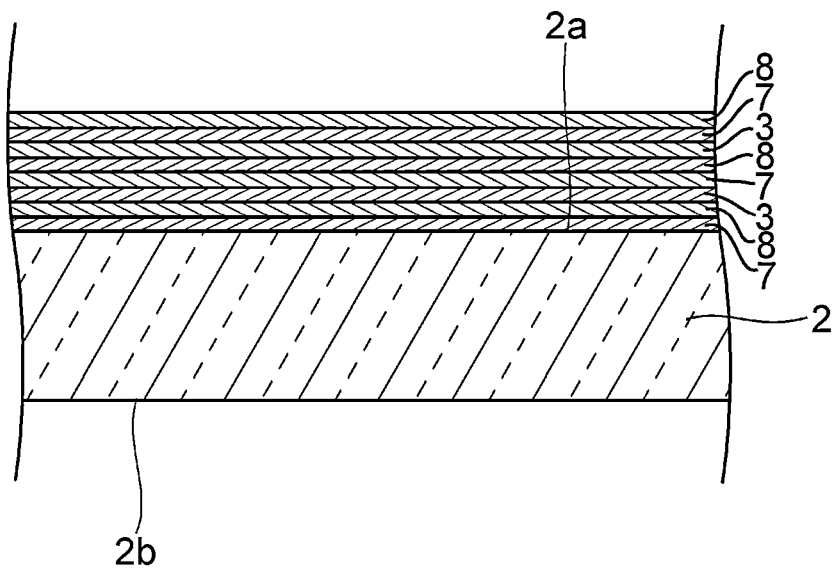

[FIG. 7.]
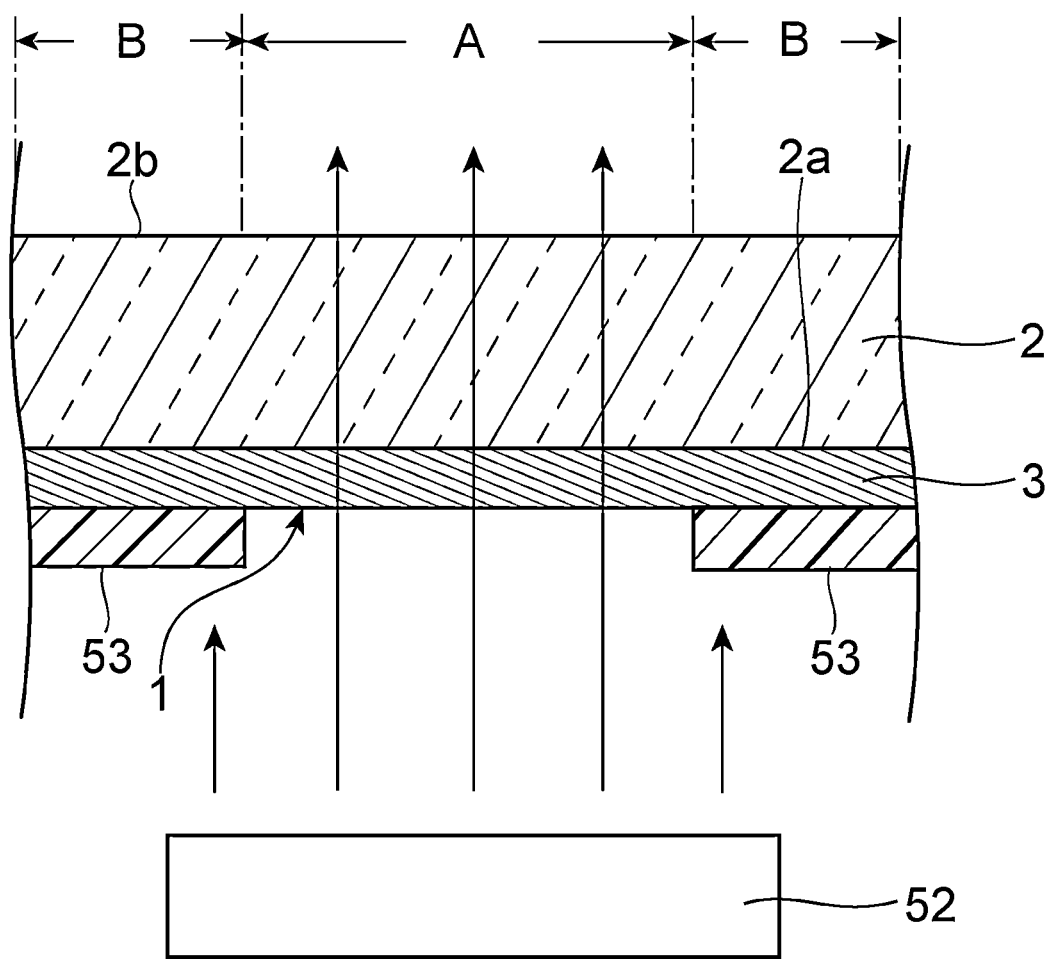

[FIG. 8.]
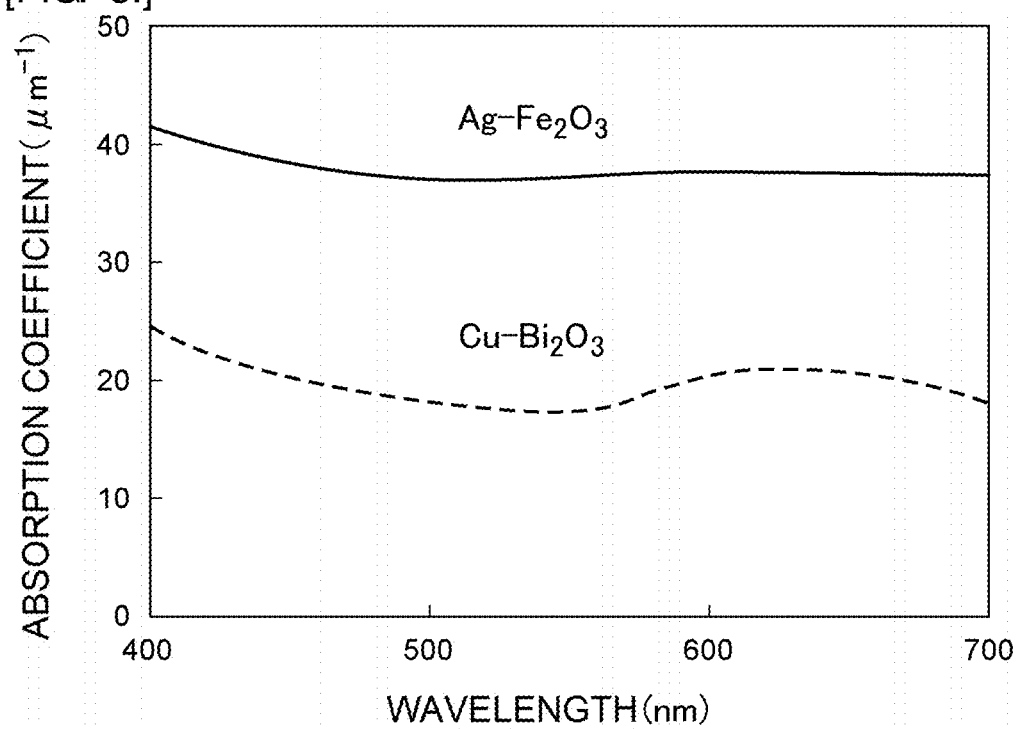
[FIG. 9.]
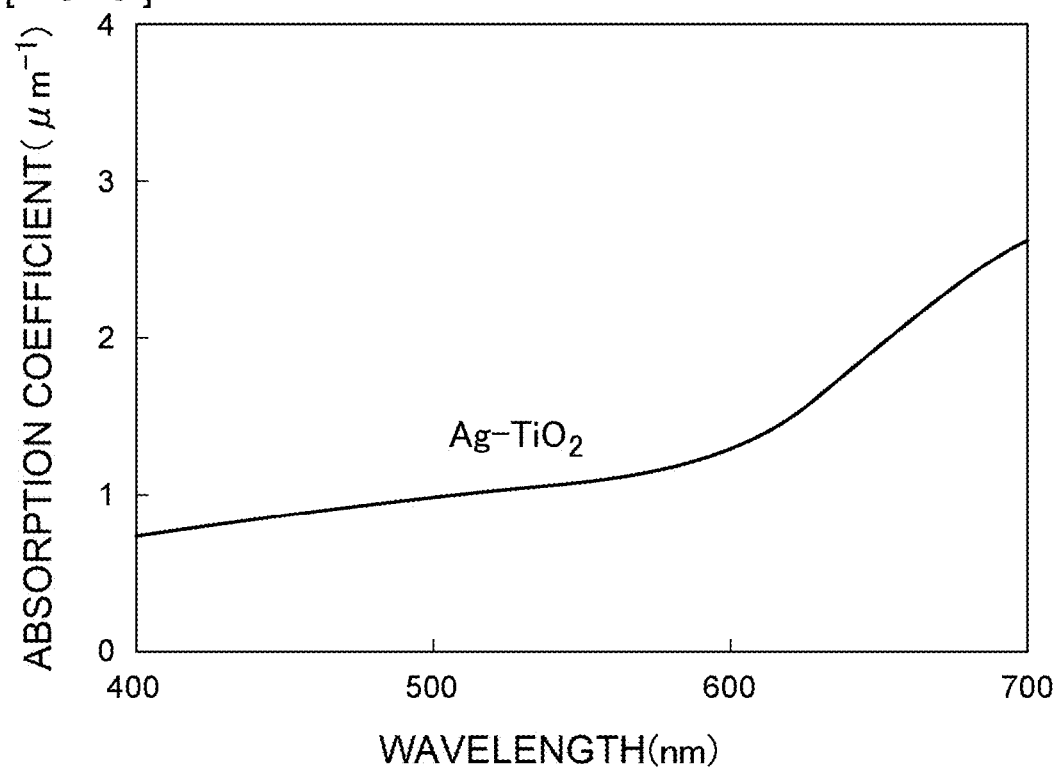

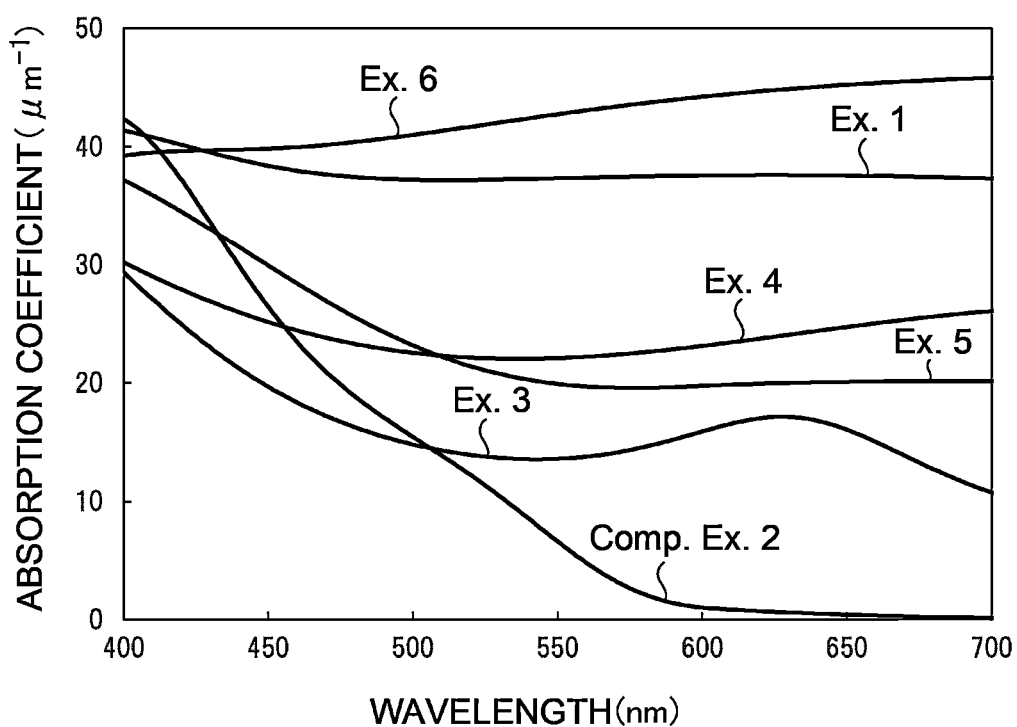
[FIG. 10.]

FILM-COVERED TRANSPARENT BASE PLATE AND TOP PLATE FOR COOKING DEVICE

TECHNICAL FIELD

The present invention relates to film-covered transparent base plates and top plates for cooking devices in which film-covered transparent base plates are used.

BACKGROUND ART

Conventionally, in cooking devices, including an electromagnetic cooking device, a radiant heater cooking device, and a gas cooking device, a top plate made of a black glass or a transparent glass with a black coating film is used for the purpose of hiding the internal structure of the cooking device. In these cooking devices, for the purpose of displaying various types of information relating to their power, heating state, and so on, the top plate may be used in combination with an LED (light emitting diode), a liquid crystal display, a liquid crystal display having a touch panel function, or so on.

Patent Literature 1 below discloses a cooking device top plate including: a glass plate; an inorganic pigment layer provided on the glass plate; and a display layer provided on the inorganic pigment layer. The inorganic pigment layer contains a pigment and a glass. The display layer includes: a transparent resin portion capable of transmitting LED light or the like; and a heat-resistant resin portion capable of blocking the LED light or the like. In Patent Literature 1, characters, numerals, signs, and so on are displayed by changing the shape of a transmission portion through which the LED light or the like passes or by passing patterned light through the transmission portion.

CITATION LIST

Patent Literature

[PTL 1]
JP-A-2014-215018

SUMMARY OF INVENTION

Technical Problem

In the case where a top plate for a cooking device is used in combination with an LED, a liquid crystal display, a liquid crystal display having a touch panel function or other light sources, it is required that various types of information is made clearly visible during turn-on of the light source and, at the same time, the internal structure of the cooking device is hidden during turn-off of the light source. However, when a glass base plate colored with black is used as a top plate, the internal structure of the cooking device can be hidden during turn-off of the light source, but there arises a problem that various information is less visible during turn-on of the light source.

On this point, in Patent Literature 1, a black inorganic pigment layer is also provided in an information displaying region of the top plate and, thus, an attempt is made to hide the internal structure of the cooking device. However, when a black inorganic pigment layer is provided as in the top plate of Patent Literature 1, the top plate does not take on achromatic black during turn-off of the light source, which may impair the aesthetic appearance.

An object of the present invention is to provide a film-covered transparent base plate having an excellent aesthetic appearance even during turn-off of a light source and a top plate for a cooking device in which the film-covered transparent base plate is used.

Solution to Problem

A film-covered transparent base plate according to the present invention includes: a transparent base plate; and a light-absorbing film provided on one principal surface of the transparent base plate, and the light-absorbing film includes a dielectric phase made of a material having a band gap of not less than 2.0 eV and not more than 2.7 eV and a metallic phase.

In the present invention, the material is preferably a metal oxide.

In the present invention, in an Ellingham diagram, a standard Gibbs energy of a metal element being a constituent of the metal oxide is preferably smaller than a standard Gibbs energy of a metal element being a constituent of the metallic phase.

In the present invention, an average absorption coefficient of the light-absorbing film in a wavelength range of 400 nm to 700 nm is preferably not less than 0.5 μm$^{-1}$ and not more than 80 μm$^{-1}$.

In the present invention, where $\alpha 1$ represents an absorption coefficient of the light-absorbing film at a wavelength of 436 nm, $\alpha 2$ represents an absorption coefficient of the light-absorbing film at a wavelength of 546 nm, and $\alpha 3$ represents an absorption coefficient of the light-absorbing film at a wavelength of 700 nm, it is preferred that a ratio of $\alpha 1/\alpha 2$ is not less than 0.8 and not more than 2.0 and a ratio of $\alpha 3/\alpha 2$ is not less than 0.8 and not more than 2.0.

Furthermore, in the present invention, it is more preferred that the ratio of $\alpha 1/\alpha 2$ in the light-absorbing film is not less than 0.8 and not more than 1.25 and the ratio of $\alpha 3/\alpha 2$ is not less than 0.8 and not more than 1.25.

In the present invention, where $\alpha_\lambda$ represents an absorption coefficient of the light-absorbing film at a wavelength of $\lambda$ and $\alpha_{AVE}$ represents an average absorption coefficient of the light-absorbing film in a wavelength range of 400 nm to 700 nm, a mean absorbance deviation M expressed by the formula (1) below is preferably 0.30 or less.

[Math. 1]

$$M = \frac{\int_{400}^{700} |\alpha_{AVE} - \alpha_\lambda| \, d\lambda}{300 \, \alpha_{AVE}} \quad \text{Formula (1)}$$

In the present invention, a dielectric multi-layer is preferably further provided on the light-absorbing film.

In the present invention, it is preferred that the dielectric multi-layer is a layered film in which a high-refractive index film having a relatively high refractive index and a low-refractive index film having a relatively low refractive index are alternately layered and that the high-refractive index film is the light-absorbing film.

A top plate for a cooking device according to the present invention includes the film-covered transparent base plate structured according to the present invention, wherein the transparent base plate has a cooking surface on which a cooking utensil is to be placed and an underside surface opposite to the cooking surface, and the light-absorbing film is provided on the underside surface of the transparent base plate.

Advantageous Effects of Invention

The present invention enables provision of a film-covered transparent base plate having an excellent aesthetic appearance even during turn-off of a light source and a top plate for a cooking device in which the film-covered transparent base plate is used.

BRIEF DESCRIPTION OF DRAWINGS

FIG. 1 is a schematic cross-sectional view showing a film-covered transparent base plate according to a first embodiment of the present invention.

FIG. 2 is a schematic cross-sectional view showing in enlarged form a light-absorbing film being a constituent of the film-covered transparent base plate according to the first embodiment of the present invention.

FIG. 3 is a graph showing an example of an Ellingham diagram of metals and metal oxides.

FIG. 4 is a schematic cross-sectional view showing a film-covered transparent base plate according to a second embodiment of the present invention.

FIG. 5 is a schematic cross-sectional view showing a film-covered transparent base plate according to a third embodiment of the present invention.

FIG. 6 is a schematic cross-sectional view showing a film-covered transparent base plate according to a fourth embodiment of the present invention.

FIG. 7 is a schematic cross-sectional view showing a top plate for a cooking device according to an embodiment of the present invention.

FIG. 8 is a graph showing the respective absorption coefficients of light-absorbing films made in examples.

FIG. 9 is a graph showing the absorption coefficient of a light-absorbing film made in a comparative example.

FIG. 10 is a graph showing the respective absorption coefficients of light-absorbing films made in Examples 1, and 3 to 6 and Comparative Example 2.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference characters.

Film-Covered Transparent Base Plate

First Embodiment

FIG. 1 is a schematic cross-sectional view showing a film-covered transparent base plate according to a first embodiment of the present invention. FIG. 2 is a schematic cross-sectional view showing in enlarged form a light-absorbing film being a constituent of the film-covered transparent base plate according to the first embodiment of the present invention.

As shown in FIG. 1, a film-covered transparent base plate 1 includes a transparent base plate 2 and a light-absorbing film 3. The transparent base plate 2 has a first principal surface 2a and a second principal surface 2b opposed to each other. The light-absorbing film 3 is provided on the first principal surface 2a of the transparent base plate 2.

In this embodiment, the transparent base plate 2 has the shape of an approximately rectangular plate. However, the transparent base plate 2 may be approximately disc-shaped and the shape thereof is not particularly limited.

The transparent base plate 2 transmits light in a wavelength range of 400 nm to 700 nm. The transparent base plate 2 may be clear and colored, but is preferably clear and colorless from the perspective of further increasing the aesthetic appearance. Note that "clear" herein means that the light transmittance in a visible wavelength range from 400 nm to 700 nm is 80% or more. Furthermore, "colorless" means that the saturation of transmitted light upon application of light from a D65 light source is 2 or less.

In this embodiment, the transparent base plate 2 is made of a glass. However, the transparent base plate 2 may be made of another material, such as ceramics, so long as it is a transparent base plate.

The glass making up the transparent base plate 2 is preferably a glass having a high glass transition temperature and low expansibility or a low-expansion crystallized glass. A specific example of the low-expansion crystallized glass is "N-0" manufactured by Nippon Electric Glass Co., Ltd. Borosilicate glass, alkali-free glass, aluminosilicate glass or the like may be used as the transparent base plate 2. In these cases, the thermal resistance of the transparent base plate 2 can be further increased and the coefficient of thermal expansion thereof can be further lowered. Therefore, the transparent base plate 2 can be suitably used for a top plate for a cooking device and so on undergoing repeated heating and cooling.

No particular limitation is placed on the thickness of the transparent base plate 2. The thickness of the transparent base plate 2 can be appropriately selected according to the light transmittance and so on. The thickness of the transparent base plate 2 may be, for example, about 0.035 mm to about 5 mm.

The light-absorbing film 3 is provided on the first principal surface 2a of the transparent base plate 2. As shown in FIG. 2, the light-absorbing film 3 includes a dielectric phase 4 and a metallic phase 5. In this embodiment, the dielectric phase 4 is a matrix and the metallic phase 5 is dispersed in the matrix of the dielectric phase 4. The metallic phase 5 may be exposed at the surface of the dielectric phase 4. Alternatively, the light-absorbing film 3 may be formed of a simple mixture of the dielectric phase 4 and the metallic phase 5 and no particular limitation is placed on the form of the mixture. Elements of the metallic phase 5 may be partly in contact with each other unless a conductive path of the metallic phase 5 is formed throughout the light-absorbing film 3, and the elements of the metallic phase 5 may not necessarily be of uniform size. These structures can be appropriately adjusted, for example, by the feed ratio of materials making up the dielectric phase 4 and the metallic phase 5.

No particular limitation is placed on the method for forming the light-absorbing film 3 and the light-absorbing film 3 can be formed, for example, by sputtering, plus laser deposition (PLD), vapor deposition or so on, which belong to the physical vapor deposition method (PVD method).

In this embodiment, the dielectric phase 4 is made of a material having a band gap of not less than 2.0 eV and not more than 2.7 eV. Among other materials, the dielectric phase 4 is preferably made of a metal oxide having a band gap of not less than 2.0 eV and not more than 2.7 eV. Alternatively, the dielectric phase 4 may be made of a metal oxynitride or metal nitride having a band gap of not less than 2.0 eV and not more than 2.7 eV. The band gap can be calculated, for example, from the Tauc plot.

Examples of the metal oxide having a band gap of not less than 2.0 eV and not more than 2.7 eV include $Bi_2O_3$ (2.5 eV), $Fe_2O_3$ (2.1 eV), $Fe_3O_4$ (2.0 eV), $V_2O_5$ (2.3 eV), $WO_3$ (2.5 eV), $MoO_3$ (2.7 eV), and $Cr_2O_3$ (2.6 eV). Alternatively, the material may be a composite oxide, such as $BiVO_4$ (2.3 eV), containing cations of any of the above metal oxides. Examples of the metal oxynitride having a band gap of not less than 2.0 eV and not more than 2.7 eV include $SrTaO_2N$ and $TiO_{2-x}N_x$.

No particular limitation is placed on the type of metal making up the metallic phase 5 and, examples include Au, Ag, Cu, Pt, Pd, Rh, Zn, Fe, Sn, Ni, and Pb. The metallic phase 5 may be made of an alloy of any of these metals. Examples of the alloy include FeNi and CuNi.

The film-covered transparent base plate 1 according to this embodiment has the feature that the light-absorbing film 3 provided on the first principal surface 2a of the transparent base plate 2 is composed of the dielectric phase 4 having a band gap of not less than 2.0 eV and not more than 2.7 eV and the metallic phase 5. Thus, the film-covered transparent base plate 1 makes the indication of various information clearly visible during turn-on of the light source and has an excellent aesthetic appearance during turn-off of the light source. The reasons for this can be explained as follows.

Conventionally, in the case where a glass base plate colored with black is used as a base plate, such as a top plate for a cooking device, the internal structure of the cooking device can be hidden during turn-off of a light source, such as an LED or a liquid crystal display, but there arises a problem that various information is less visible during turn-on of the light source. On the other hand, in the case where a black inorganic pigment layer is provided on a transparent base plate, such as a glass base plate, the base plate does not take on achromatic black during turn-off of the light source, which may impair the aesthetic appearance.

In this relation, the conventional top plate has a problem that the material making up the inorganic pigment layer does not take on achromatic black, because the material strongly absorbs the short wavelength side (violet and blue side having higher light energy) of visible light and weakly absorbs the long wavelength side (red side having lower light energy) of visible light.

Unlike the above, in the light-absorbing film 3 according to this embodiment, light absorption of the short wavelength side of visible light is covered by light absorption due to the band gap of the dielectric phase 4 and light absorption of the long wavelength side of visible light can be covered by light absorption due to free electrons of the metallic phase 5. Therefore, the top plate takes on achromatic black during turn-off of the light source and thus has an excellent aesthetic appearance.

More specifically, the absorption coefficient $\alpha(\lambda)$ dependent on the wavelength of light is expressed by the following formula (I).

$$\alpha(\lambda)=\alpha(\lambda)_{band\ gap\ type}+\alpha(\lambda)_{free\ electron\ type}=A\cdot\lambda^{-n}+B\cdot\lambda^2 \approx C\cdot\lambda^0$$ Formula (I)

(where A, B, and C are constants and n>0)

Specifically, the absorption coefficient derived from the band gap of the dielectric phase 4 covering light absorption of the short wavelength side of visible light is proportional to the $n^{th}$ power of the reciprocal of the wavelength, while the absorption coefficient derived from free electrons of the metallic phase 5 covering light absorption of the long wavelength side of visible light is proportional to the square of the wavelength. Therefore, the absorption coefficient $\alpha(\lambda)$ of the light-absorbing film 3 expressed by the sum of the above two absorption coefficients approximately does not depend on the wavelength and is likely to take a constant value at any wavelength.

As seen from the above, the film-covered transparent base plate 1 including the light-absorbing film 3 can absorb light uniformly, particularly, over the approximately entire range of visible light. Therefore, the film-covered transparent base plate 1 can take on achromatic black during turn-off of the light source and thus has an excellent aesthetic appearance. Hence, the film-covered transparent base plate 1 can be suitably used for a top plate for a cooking device, a cover glass for a display, and like applications.

In the present invention, the band gap of the dielectric phase 4 is preferably not more than 2.5 eV and more preferably not more than 2.3 eV. In this case, the film-covered transparent base plate 1 can absorb light uniformly, more independent of the wavelength, so that the aesthetic appearance of the film-covered transparent base plate 1 can be further increased.

The band gap of the dielectric phase 4 is preferably of indirect transition type. In this case, the film-covered transparent base plate 1 can absorb light uniformly, more independent of the wavelength, so that the aesthetic appearance of the film-covered transparent base plate 1 can be further increased.

The light-absorbing film 3 preferably has chemical stability enabling coexistence of the dielectric phase 4 and the metallic phase 5. In this relation, when the dielectric phase 4 is made of a metal oxide, a preferred combination of the dielectric phase 4 and the metallic phase 5 can be determined according to an Ellingham diagram shown in FIG. 3.

The Ellingham diagram shown in FIG. 3 shows that, the lower the standard Gibbs energy of each metal element, the more stable the metal in an oxide state, the higher the standard Gibbs energy of each metal element, the more stable the metal in a metallic state. For example, the diagram means that metal Ag can exist stably in an oxide of Fe, but metal Fe cannot exist stably (i.e., is likely to be oxidized) in respective oxides of Bi, Cu, and Ag. Therefore, the standard Gibbs energy of the metal element being a constituent of the dielectric phase 4 is preferably smaller than the standard Gibbs energy of the metal element being a constituent of the metallic phase 5. In this case, the chemical stability enabling the coexistence of the dielectric phase 4 and the metallic phase 5 can be further increased and the aesthetic appearance of the film-covered transparent base plate 1 can be further increased. Note that FIG. 3 shows an example of the Ellingham diagram and the Ellingham diagram is also applicable to other metals.

In view of the above, regarding the preferred combination of the dielectric phase 4 and the metallic phase 5, for example, when an oxide of a base metal, such as PbO or $Bi_2O_3$, is used as the dielectric phase 4, for example, Au, Ag, Cu, Pt, Pd, and/or Rh is preferably used as the metallic phase 5. When an oxide of a noble metal, such as $V_2O_5$ or $Cr_2O_3$, is used as the dielectric phase 4, for example, Zn, Fe, Sn, Ni, and/or Pb is preferably used as the metallic phase 5.

Specific examples of the preferred combination of the dielectric phase 4 and the metallic phase 5 include a combination of $Fe_2O_3$ and Ag, a combination of $Bi_2O_3$ and Cu, a combination of PbO and Pt, a combination of $Cr_2O_3$ and Pb, a combination of $BiVO_4$ and Ag, and a combination of $V_2O_5$ and FeNi, $SrTaO_2N$ or CuNi.

As in this embodiment, the metallic phase 5 is preferably dispersed in the dielectric phase 4 serving as a matrix. In this case, the insulation property of the light-absorbing film 3 can be further increased. Therefore, in this case, the light-absorbing film 3 can be suitably used for a display with a touch panel function or a top plate for a cooking device containing a display with a touch panel function.

The volume ratio of the metallic phase 5 in the entire light-absorbing film 3 ((metallic phase 5)/(dielectric phase 4+metallic phase 5)) is preferably not less than 0.3, more preferably not less than 0.5, preferably not more than 0.8, and more preferably not more than 0.7. When the above volume ratio ((metallic phase 5)/(dielectric phase 4+metallic phase 5)) is the above lower limit or more, the insulation property of the light-absorbing film 3 can be further increased. On the other hand, when the above volume ratio ((metallic phase 5)/(dielectric phase 4+metallic phase 5)) is the above upper limit or less, more sufficient light absorption can be achieved at wavelengths likely to cause optical interference.

The average absorption coefficient of the light-absorbing film 3 in a wavelength range of 400 nm to 700 nm is preferably not less than 0.5 µm$^{-1}$, more preferably not less than 10 µm$^{-1}$, preferably not more than 80 µm$^{-1}$, and more preferably not more than 70 µm$^{-1}$. At an average absorption coefficient of the above lower limit or more, for example, when the light-absorbing film 3 is used for a top plate for a cooking device, it can more certainly hide the internal structure of the cooking device. On the other hand, at an average absorption coefficient of the above upper limit or less, the light-absorbing film 3 can more certainly make the indication of various information clearly visible during turn-on of the light source. The absorption coefficient of the light-absorbing film 3 is derived from measurements of transmittance, reflectance, and so on by spectroscopic ellipsometry or with a spectro-photometer, in which case measurements are made with the light-absorbing film on top of the transparent base plate 2 and from the light-absorbing film 3 side.

Furthermore, where α1 represents an absorption coefficient of the light-absorbing film 3 at a wavelength of 436 nm, α2 represents an absorption coefficient of the light-absorbing film 3 at a wavelength of 546 nm, and α3 represents an absorption coefficient of the light-absorbing film 3 at a wavelength of 700 nm, it is preferred that a ratio of α1/α2 is not less than 0.8 and not more than 2.0 and a ratio of α3/α2 is not less than 0.8 and not more than 2.0. It is more preferred that the ratio of α1/α2 is not less than 0.8 and not more than 1.25 and the ratio of α3/α2 is not less than 0.8 and not more than 1.25. In this case, the light-absorbing film 3 can take on more achromatic black during turn-off of the light source and thus have a more excellent aesthetic appearance.

Where α represents an absorption coefficient of the light-absorbing film at a wavelength of λ and $α_{AVE}$ represents an average absorption coefficient of the light-absorbing film in a wavelength range of 400 nm to 700 nm, a mean absorbance deviation M expressed by the formula (1) below is preferably 0.30 or less. In this case, the light-absorbing film 3 can take on more achromatic black during turn-off of the light source and thus have a more excellent aesthetic appearance.

[Math. 2]

$$M = \frac{\int_{400}^{700} |α_{AVE} - α_λ| \, dλ}{300 \, α_{AVE}} \quad \text{Formula (1)}$$

In the present invention, the content of metal making up the metallic phase 3 in the light-absorbing film 3 is, in terms of % by mole, preferably not less than 5%, more preferably not less than 10%, still more preferably not less than 12%, preferably not more than 80%, more preferably not more than 70%, still more preferably not more than 60%, and particularly preferably not more than 55%. If the content of metal making up the metallic phase 5 in the light-absorbing film 3 is smaller than the above lower limit, the above ratio of α1/α2 may become excessively high, the above ratio of α3/α2 may become excessively low, and the above mean absorbance deviation M may become excessively large. On the other hand, if the content of metal making up the metallic phase 5 in the light-absorbing film 3 is larger than the above upper limit, the sheet resistance may be likely to decrease. In addition, the above ratio of α1/α2 may become excessively low, the above ratio of α3/α2 may become excessively high, and the above mean absorbance deviation M may become excessively large.

The thickness of the light-absorbing film 3 is not particularly limited, but is preferably not less than 5 nm, more preferably not less than 10 nm, preferably not more than 2 µm, and more preferably not more than 1 µm. When the thickness of the light-absorbing film 3 is in the above range, the indication of various information can be made more clearly visible during turn-on of the light source and a more excellent aesthetic appearance can be achieved during turn-off of the light source.

The saturation $C^*_T$ of transmitted light from the film-covered transparent base plate 1 is preferably not more than 2, more preferably not more than 1, and still more preferably not more than 0.5. Furthermore, the saturation $C^*_R$ of reflected light from the film-covered transparent base plate 1 is preferably not more than 2, more preferably not more than 1, and still more preferably not more than 0.5. Herein, the saturation C* refers to, in the L*a*b* color system adopted in JIS Z 8781-4: 2013, a saturation C* when light of a D65 light source is applied to the film-covered transparent base plate 1. The saturation C* is determined from the chromaticity a* and b* and expressed by $C^* = ((a^*)^2 + (b^*)^2)^{1/2}$. In this case, the film-covered transparent base plate 1 can take on more achromatic black during turn-off of the light source and thus have a more excellent aesthetic appearance.

From the perspective of making the boundary between a below-described displaying region A and non-displaying region B more difficult to see, the absolute value of the difference in lightness (L*) between the displaying region A and the non-displaying region B is preferably 3 or less and more preferably 1 or less. Furthermore, the absolute value of the difference in saturation (C*) between the displaying region A and the non-displaying region B is preferably 0.7 or less and more preferably 0.4 or less.

The sheet resistance of the light-absorbing film 3 is preferably 10$^6$ ohms/square or more, and more preferably 10$^8$ ohms/square or more. In this case, since the light-absorbing film 3 has insulation property, when it is used for a cover glass for an image display device or a top plate for a cooking device and even equipped with a touch panel, changes in capacitance due to finger contact necessary for a capacitive touch sensor can be maintained, which makes the touch panel operative. The sheet resistance can be measured by the method defined in ASTM D257 or JIS K 6271-6 (2008).

Second Embodiment, Third Embodiment, and Fourth Embodiment

FIG. 4 is a schematic cross-sectional view showing a film-covered transparent base plate according to a second embodiment of the present invention. As shown in FIG. 4, in a film-covered transparent base plate 21, a dielectric multi-layer 6 is further provided on a light-absorbing film 3. The rest is the same as in the first embodiment.

The dielectric multi-layer 6 is a layered film in which low-refractive index films 7 having a relatively low refractive index and high-refractive index films 8 having a relatively high refractive index are layered alternately in this order. In this embodiment, the number of layers forming the dielectric multi-layer 6 is six.

Examples of the material for the low-refractive index film 7 include silicon oxide, as used in this embodiment, and aluminum oxide.

Examples of the material for the high-refractive index film 8 include niobium oxide, as used in this embodiment, titanium oxide, zirconium oxide, hafnium oxide, tantalum oxide, silicon nitride, aluminum oxide, and aluminum nitride.

FIG. 5 is a schematic cross-sectional view showing a film-covered transparent base plate according to a third embodiment of the present invention. As shown in FIG. 5, in a film-covered transparent base plate 31, a dielectric multi-layer 16 containing light-absorbing films 3 is provided on a first principal surface 2a of a transparent base plate 2. The rest is the same as in the first embodiment.

In the dielectric multi-layer 16, low-refractive index films 7 having a relatively low refractive index and the light-absorbing films 3 serving as high-refractive index films having a relatively high refractive index are layered alternately in this order. In this embodiment, the number of layers forming the dielectric multi-layer 16 is six. The light-absorbing films 3 are light-absorbing films 3 described in the first embodiment and the low-refractive index films 7 are low-refractive index films 7 described in the second embodiment. At least one of the three light-absorbing films 3 may be a high-refractive index film 8 described in the second embodiment.

FIG. 6 is a schematic cross-sectional view showing a film-covered transparent base plate according to a fourth embodiment of the present invention. As shown in FIG. 6, in a film-covered transparent base plate 41, two light-absorbing films 3 are provided on a transparent base plate 2, a dielectric multi-layer 6 is further provided between the transparent base plate 2 and one light-absorbing film 3, and a dielectric multi-layer 6 is further provided between the two light-absorbing films. The rest is the same as in the second embodiment.

Also in the second embodiment, the third embodiment, and the fourth embodiment, the light-absorbing film or films 3 provided on the first principal surface 2a of the transparent base plate 2 are each composed of a dielectric phase 4 having a band gap of not less than 2.0 eV and not more than 2.7 eV and a metallic phase 5. Thus, the film-covered transparent base plate makes the indication of various information clearly visible during turn-on of the light source and has an excellent aesthetic appearance during turn-off of the light source.

A dielectric multi-layer 6 may be provided on a light-absorbing film 3 as in the second embodiment, a dielectric multi-layer 16 containing light-absorbing films 3 may be provided on a transparent base plate 2 as in the third embodiment, or as in the fourth embodiment it is also possible that two light-absorbing films 3 are provided on a transparent base plate 2, a dielectric multi-layer 6 is further provided between the transparent base plate 2 and one light-absorbing film 3, and a dielectric multi-layer 6 is further provided between the two light-absorbing films 3. When the dielectric multi-layer 6 or is provided in the above manners, for example, an anti-reflection function can be further given to the film-covered transparent base plate. In this case, the contrast of the display can also be improved.

Top Plate for Cooking Device

FIG. 7 is a schematic cross-sectional view showing a top plate for a cooking device according to an embodiment of the present invention. As shown in FIG. 7, a top plate 51 for a cooking device includes a film-covered transparent base plate 1.

In the top plate 51 for a cooking device, a second principal surface 2b of a transparent base plate 2 being a constituent of the film-covered transparent base plate 1 is a cooking surface. On the other hand, a first principal surface 2a of the transparent base plate 2 being a constituent of the film-covered transparent base plate 1 is an underside surface. The cooking surface is a surface located on the side of the transparent base plate where a cooking utensil, such as a pot or a frying pan, is to be placed. The underside surface is a surface located on the side of the transparent base plate close to the interior of the cooking device and facing a light source 52, such as an LED or a display, and a heater. Therefore, the cooking surface and the underside surface are top and under sides of the same base plate. In this embodiment, the transparent base plate 2 is a glass base plate.

A light-absorbing film 3 is provided on the underside surface (first principal surface 2a) of the transparent base plate 2. A heat-resistant resin layer 53 is provided on the light-absorbing film 3. The heat-resistant resin layer 53 may be provided between the transparent base plate 2 and the light-absorbing film 3. In this embodiment, a region where the heat-resistant resin layer 53 is not provided in plan view is a displaying region A. On the other hand, a region where the heat-resistant resin layer 53 is provided in plan view is a non-displaying region B.

The heat-resistant resin layer 53 is a light blocking layer. Therefore, when the heat-resistant resin layer 53 is provided, the hideability of the internal structure of the cooking device can be further increased. The heat-resistant resin layer 53 can be formed of a heat-resistant resin, such as silicone resin, a coloring pigment, and so on. However, the heat-resistant resin layer 53 may not necessarily be provided.

Below the film-covered transparent base plate 1, a light source 52, such as a display or an LED, is provided. The light source 52 is a member provided for the purpose of displaying information in the displaying region A. No particular limitation is placed on the type of information to be displayed in the displaying region A and examples include information indicating a state of the cooking device, such as a state that the power is on or a state that the cooking device is during heating, and information on time and so on.

In the displaying region A, light from the light source is emitted through the light-absorbing film 3 and the transparent base plate 2 to the outside. On the other hand, in the non-displaying region B, the light from the light source 52 is blocked by the heat-resistant resin layer 53. Therefore, by transmitting the light from the light source 52 through the displaying region A, characters, numerals, signs, and so on can be displayed in the displaying region A.

The top plate 51 for a cooking device includes the film-covered transparent base plate 1. Thus, the top plate 51 for a cooking device makes the indication of various information clearly visible during turn-on of the light source 52 and has an excellent aesthetic appearance during turn-off of the light source 52. In addition, the boundary between the displaying region and the non-displaying region can be made less visible while the internal structure of the cooking device is hidden. A display having a touch panel function may be contained in the interior of the cooking device.

Hereinafter, a description will be given in further detail of the present invention with reference to examples. However, the following examples are merely illustrative. The present invention is not at all limited by the following examples.

Examples 1 and 2

In Example 1, using an Ag/FeO mixed target, a light-absorbing film 3 was formed on a glass base plate, which is a transparent base plate 2, by pulse laser deposition (PLD). The content of Ag in the mixed target was 60% by mole. During that time, the base plate temperature was 300° C. and the oxygen partial pressure was 0.5 Pa. The content of Ag in the light-absorbing film 3 was 45% by mole.

In Example 2, using a Cu/$Bi_2O_3$ mixed target, a light-absorbing film 3 was formed on a glass base plate, which is a transparent base plate 2, by pulse laser deposition (PLD). The content of Cu in the mixed target was 30% by mole. During that time, the base plate temperature was 350° C. and the oxygen partial pressure was less than 0.1 Pa. The content of Cu in the light-absorbing film 3 was 30% by mole.

The band gap of $Fe_2O_3$ is 2.1 eV and the band gap of $Bi_2O_3$ is 2.5 eV.

FIG. 8 is a graph showing the respective absorption coefficients of the light-absorbing film 3 of Ag and $Fe_2O_3$ and the light-absorbing film 3 of Cu and $Bi_2O_3$ in a wavelength range of 400 nm to 700 nm. It can be seen from FIG. 8 that in each of the light-absorbing film 3 of Ag and $Fe_2O_3$ and the light-absorbing film 3 of Cu and $Bi_2O_3$, the absorption coefficient was approximately constant in a wavelength range of 400 nm to 700 nm. In the light-absorbing film 3 of Ag and $Fe_2O_3$, $\alpha1/\alpha2$ was 1.05, $\alpha3/\alpha2$ was 1.00, and the mean absorbance deviation M was 0.02. In the light-absorbing film 3 of Cu and $Bi_2O_3$, $\alpha1/\alpha2$ was 1.22, $\alpha3/\alpha2$ was 0.84, and the mean absorbance deviation M was 0.26.

When the electrical resistance of the light-absorbing film 3 of Ag and $Fe_2O_3$ was measured by the two-terminal DC method using platinum electrodes, the sheet resistance value was $1.2 \times 10^8$ ohms/square. On the other hand, the sheet resistance value of the light-absorbing film 3 of Cu and $Bi_2O_3$ was $3.4 \times 10^{13}$ ohms/square.

When the light-absorbing film 3 of Cu and $Bi_2O_3$ was heated to over 150° C. in the atmosphere, its absorption coefficient slightly decreased. On the other hand, the light-absorbing film 3 of Ag and $Fe_2O_3$ was stable up to about 400° C. In order to further increase the thermal resistance, a high-melting point material, such as $Al_2O_3$, may be further added to the light-absorbing film 3.

Comparative Example 1

In Comparative Example 1, using an Ag/$TiO_2$ mixed target, a light-absorbing film was formed on a glass base plate by pulse laser deposition (PLD). During that time, the base plate temperature was 600° C. and the oxygen partial pressure was 0.5 Pa. The band gap of $TiO_2$ is 2.8 eV.

FIG. 9 is a graph showing the absorption coefficient of the light-absorbing film of Ag and $TiO_2$ in a wavelength range of 400 nm to 700 nm. It can be seen from FIG. 9 that, in the light-absorbing film of Ag and $TiO_2$, the absorption coefficient increased as the wavelength was larger, so that the absorption coefficient was not constant in a wavelength range of 400 nm to 700 nm. Furthermore, $\alpha1/\alpha2$ was 0.79, $\alpha3/\alpha2$ was 2.51, and the mean absorbance deviation M was 0.36. This shows that when the band gap of the dielectric phase is larger than 2.7 eV, it is difficult to make the absorption coefficient constant over the entire visible light range.

It was confirmed that the film-covered transparent base plates in Examples 1 and 2 made the indication of various information clearly visible during turn-on of the light source and had an excellent aesthetic appearance during turn-off of the light source. In contrast, in Comparative Example 1, its aesthetic appearance was impaired during turn-off of the light source.

(Examples 3 to 6 and Comparative Example 2) In Examples 3 to 6, a light-absorbing film 3 was formed in the same manner as in Example 1 except that the content of Ag in the Ag/FeO mixed target and the content of Ag in the light-absorbing film 3 were changed as described in Table 1 below. In Comparative Example 2, a light-absorbing film was formed in the same manner as in Example 1 except that an FeO target containing no Ag was used. Table 1 below also shows the ratios of $\alpha1/\alpha2$, the ratios of $\alpha3/\alpha2$, the mean absorbance deviations M, and the sheet resistance values of the above examples and comparative examples.

TABLE 1

|  | Ex. 1 | Ex. 3 | Ex. 4 | Ex. 5 | Ex. 6 | Comp. Ex. 2 |
|---|---|---|---|---|---|---|
| Ag Content in Target (mol %) | 60 | 20 | 30 | 40 | 80 | 0 |
| Ag Content in Light-Absorbing Film (mol %) | 45 | 15 | 22 | 30 | 60 | 0 |
| Sheet Resistance ($\Omega/\square$) | $1.2 \times 10^8$ | $3 \times 10^{10}$ | $1.5 \times 10^{10}$ | $2 \times 10^{10}$ | $5 \times 10^5$ | $1.5 \times 10^{10}$ |
| $\alpha 1$ | 39.1 | 21.9 | 26.3 | 32.1 | 39.7 | 31.3 |
| $\alpha 2$ | 37.3 | 13.6 | 22.1 | 20.1 | 42.6 | 7.5 |
| $\alpha 3$ | 37.3 | 10.7 | 26.1 | 20.2 | 45.8 | 0.2 |
| $\alpha$ AVE | 37.9 | 16.6 | 24.2 | 23.5 | 42.6 | 11.8 |
| $\alpha 1/\alpha 2$ | 1.1 | 1.6 | 1.2 | 1.6 | 0.9 | 4.2 |
| $\alpha 3/\alpha 2$ | 1.0 | 0.8 | 1.2 | 1.0 | 1.1 | 0.02 |
| M | 0.02 | 0.18 | 0.07 | 0.19 | 0.05 | 0.93 |

FIG. 10 is a graph showing the respective absorption coefficients of the light-absorbing films of Examples 1, and 3 to 6 and Comparative Example 2 in a wavelength range of 400 nm to 700 nm. It can be seen from FIG. 10 that, also in the light-absorbing films 3 of Examples 3 to 6, the absorption coefficient was approximately constant in a wavelength range of 400 nm to 700 nm. Furthermore, it can be seen from FIG. 10 that, in the light-absorbing film of Comparative Example 2, the absorption coefficient decreased as the wavelength was larger, so that the absorption coefficient was not constant in a wavelength range of 400 nm to 700 nm.

It was confirmed that also the film-covered transparent base plates of Examples 3 to 6 made the indication of various information clearly visible during turn-on of the light source and had an excellent aesthetic appearance during turn-off of the light source. In contrast, in Comparative Example 2, its aesthetic appearance was impaired during turn-off of the light source.

REFERENCE SIGNS LIST 1, 21, 31, 41 . . . film-covered transparent base plate
2 . . . transparent base plate
2a . . . first principal surface
2b . . . second principal surface
3 . . . light-absorbing film
4 . . . dielectric phase
5 . . . metallic phase
6, 16 . . . dielectric multi-layer
7 . . . low-refractive index film
8 . . . high-refractive index film
51 . . . top plate for a cooking device
52 . . . light source
53 . . . heat-resistant resin layer

The invention claimed is:

1. A film-covered transparent base plate comprising:
a transparent base plate; and
a light-absorbing film provided on one principal surface of the transparent base plate, wherein
the light-absorbing film including a dielectric phase made of a material having a band gap of not less than 2.0 eV and not more than 2.7 eV and a metallic phase,
a content of metal making up the metallic phase of the light-absorbing film is, in terms of % by mole, not less than 10%, and
where $\alpha 1$ represents an absorption coefficient of the light-absorbing film at a wavelength of 436 nm, $\alpha 2$ represents an absorption coefficient of the light-absorbing film at a wavelength of 546 nm, and $\alpha 3$ represents an absorption coefficient of the light-absorbing film at a wavelength of 700 nm, a ratio of $\alpha 1/\alpha 2$ is not less than 0.8 and not more than 2.0 and a ratio of $\alpha 3/\alpha 2$ is not less than 0.8 and not more than 2.0.

2. The film-covered transparent base plate according to claim 1, wherein the material is a metal oxide.

3. The film-covered transparent base plate according to claim 2, wherein, in an Ellingham diagram, a standard Gibbs energy of a metal element being a constituent of the metal oxide is smaller than a standard Gibbs energy of a metal element being a constituent of the metallic phase.

4. The film-covered transparent base plate according to claim 1, wherein an average absorption coefficient of the light-absorbing film in a wavelength range of 400 nm to 700 nm is not less than 0.5 um$^{-1}$ and not more than 80 um$^{-1}$.

5. The film-covered transparent base plate according to claim 1, wherein the ratio of $\alpha 1/\alpha 2$ in the light-absorbing film is not less than 0.8 and not more than 1.25 and the ratio of $\alpha 3/\alpha 2$ is not less than 0.8 and not more than 1.25.

6. The film-covered transparent base plate according to claim 1, wherein where $\alpha \lambda$ represents an absorption coefficient of the light-absorbing film at a wavelength of $\lambda$ and $\alpha_{AVE}$ represents an average absorption coefficient of the light-absorbing film in a wavelength range of 400 nm to 700 nm, a mean absorbance deviation M expressed by the formula (1) below is 0.30 or less:

[Math. 1]

$$M = \frac{\int_{400}^{700} |\alpha_{AVE} - \alpha_\lambda| \, d\lambda}{300 \, \alpha_{AVE}}. \quad \text{Formula (1)}$$

7. The film-covered transparent base plate according to claim 1, wherein a dielectric multi-layer is further provided on the light-absorbing film.

8. The film-covered transparent base plate according to claim 1, wherein
a dielectric multi-layer is provided on the transparent plate and is a layered film in which a high-refractive index film and a low-refractive index film are alternately layered, and
the high-refractive index film is the light-absorbing film.

9. The film-covered transparent base plate according to claim 1, wherein the metallic phase is made of Ag and the dielectric phase is made of iron oxide.

10. A top plate for a cooking device, the top plate comprising the film-covered transparent base plate according to claim 1, wherein
the transparent base plate has a cooking surface on which a cooking utensil is to be placed and an underside surface opposite to the cooking surface, and
the light-absorbing film is provided on the underside surface of the transparent base plate.

* * * * *